United States Patent [19]

Anderson

[11] 4,172,623
[45] Oct. 30, 1979

[54] PICTURE FRAME CABINET

[75] Inventor: Edwin V. Anderson, Glenview, Ill.

[73] Assignee: AMCO Engineering Company, Chicago, Ill.

[21] Appl. No.: 868,057

[22] Filed: Jan. 9, 1978

[51] Int. Cl.² .............................................. A47B 47/02
[52] U.S. Cl. .................................. 312/244; 174/52 R; 220/4 B; 220/80; 220/DIG. 25; 312/7 R; 312/257 R
[58] Field of Search ..... 312/257 R, 257 SK, 257 SM, 312/244, 7 R, 107, 108; 174/52 R; 73/431; 361/380, 390, 391; 220/4 B, 80, 94 A, DIG. 25

[56] References Cited

U.S. PATENT DOCUMENTS

| 2,225,958 | 12/1940 | Mandel | 312/257 R |
| 3,284,151 | 11/1966 | Morrison et al. | 312/244 |
| 4,023,871 | 5/1977 | Dantzler | 312/108 |

Primary Examiner—Mervin Stein
Assistant Examiner—Alex Grosz
Attorney, Agent, or Firm—Jack E. Dominik

[57] ABSTRACT

A cabinet is disclosed having a front frame constructed from four extruded edge members. Each extruded edge member has a running slot internal to it such that it receives a reinforcing member at each corner. The outer enclosure comprises an upper U-shaped panel and a lower U-shaped panel, each having interiorly bent outer edges which are secured by a dove-tail bent clamp positioned therebetween. A rear frame secures the enclosure in wrap-around relationship to both front and rear frames. Interior mounting posts having mounting holes thereon are secured to the front and rear frames by means of a fastener which engages a second running slot adjacent the first. The panels coupled with the mounting members secure the frame members which are reinforced at their corners and the dove-tail bent clamp secures the upper U-shaped closure portion to the lower U-shaped closure portion. The dove-tail bent clamp also forms horizontal handle assemblies on both sides of the cabinet.

32 Claims, 7 Drawing Figures

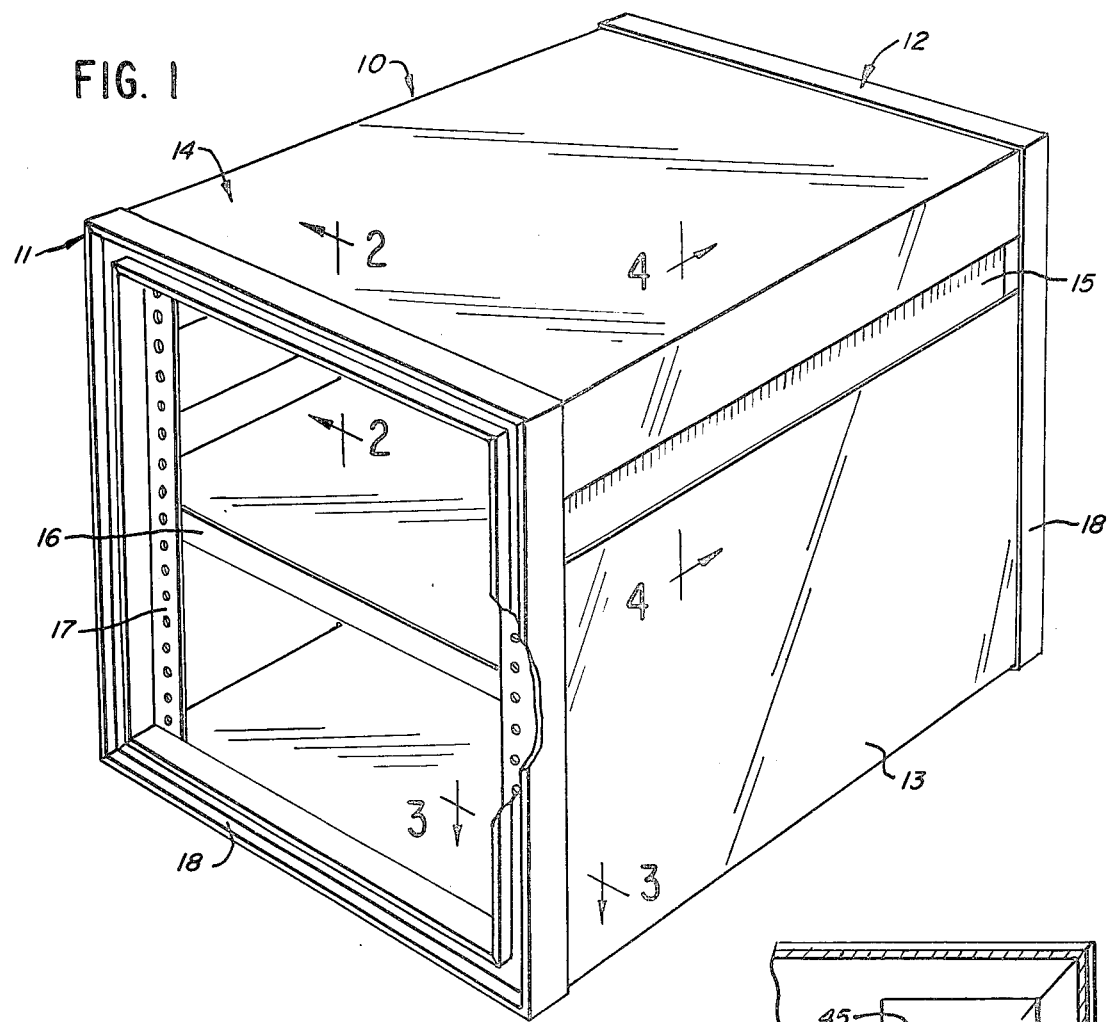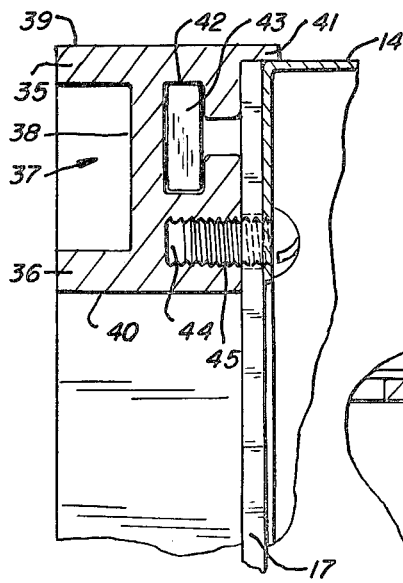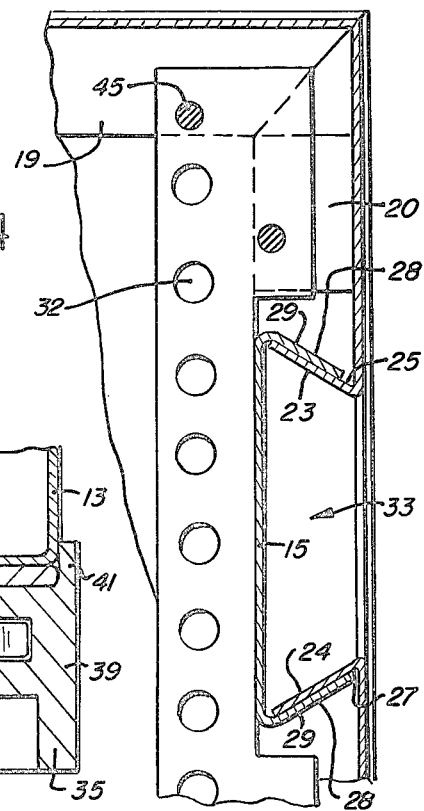

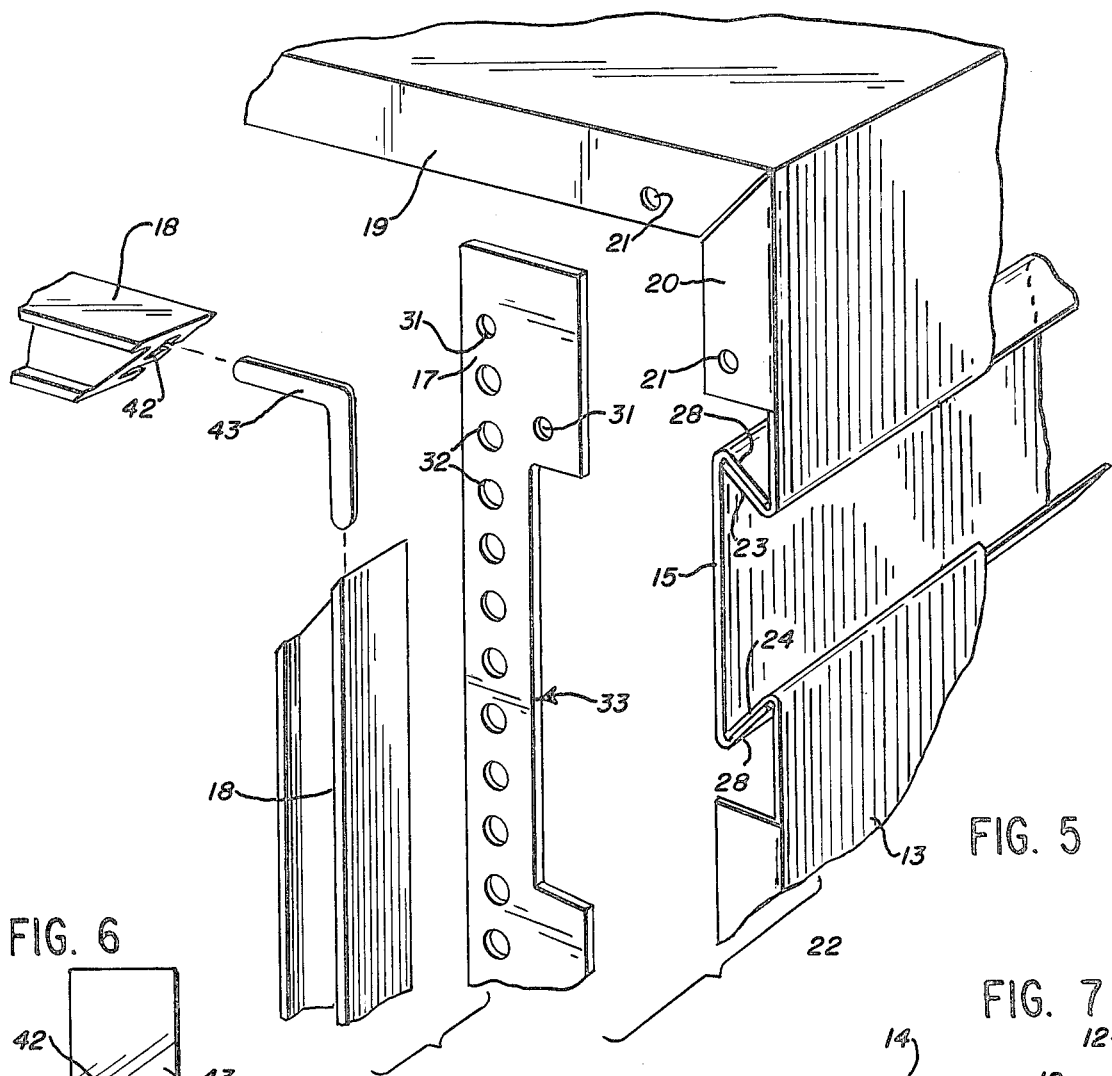
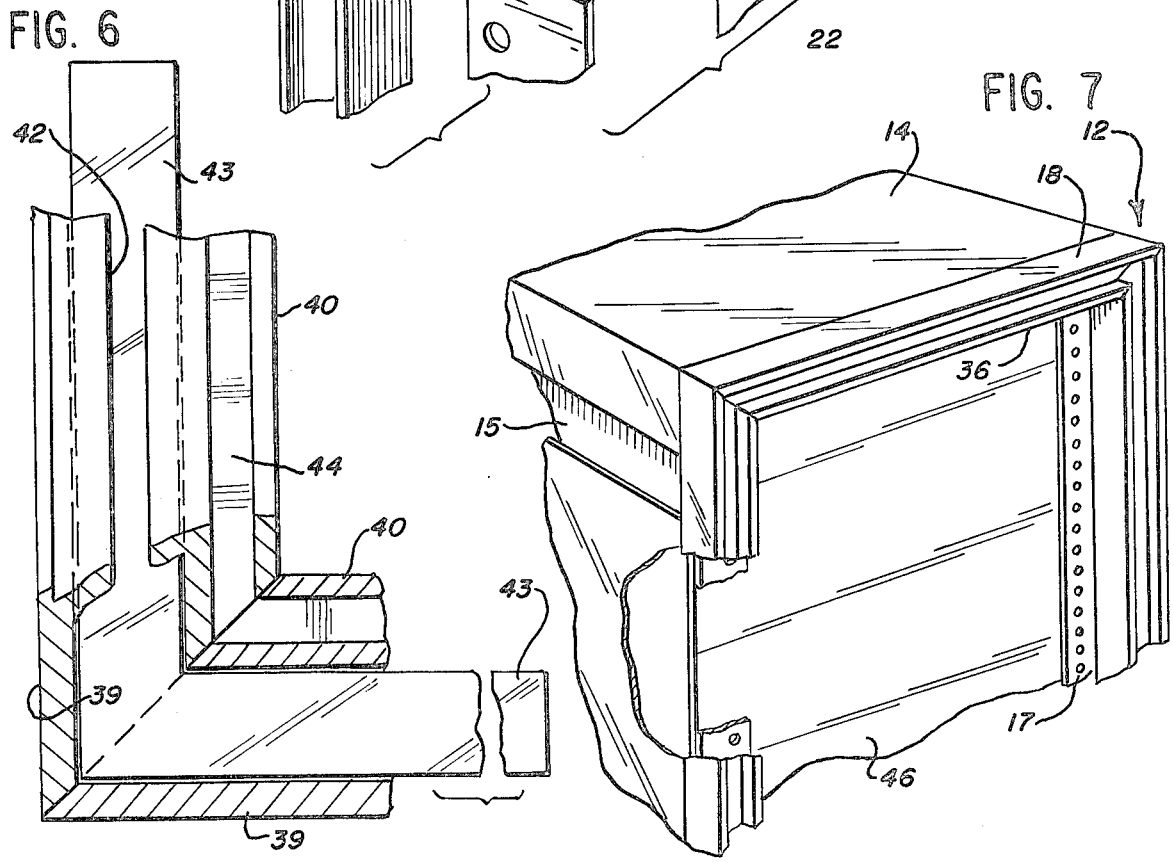

PICTURE FRAME CABINET

FIELD OF INVENTION

The present invention relates to modular instrument cabinets which may be used for housing electronic components, instruments, or groups of instruments. The subject matter is generally found in Patent Office Class 312, Sub-class 257.

The versatility of the cabinet lends its use to modular furniture construction. A desk requiring file cabinets or storage compartments could readily adapt the cabinet to such uses.

THE PRIOR ART

Various cabinets have been illustrated in the prior art, a few of which are exemplified by issued U.S. patents owned by Applicant's Assignee. One such instrument cabinet is U.S. Pat. No. 3,012,835. Larger and heavier enclosures are illustrated in U.S. Pat. Nos. 2,991,140 and 3,034,844. A smaller heavy-duty cabinet which can be adapted to various sizes is illustrated in U.S. Pat. No. 3,901,571.

The thrust of the prior art has been directed toward a heavy-duty instrument cabinet requiring numerous fasteners, supporting members, and enclosure pieces. Similarly, the handle portion for these cabinets has been a separate handle configuration protruding from the side of the cabinet and often designed to fold flush.

SUMMARY OF THE INVENTION

The present invention relates to cabinets, particularly for use in housing various electronic components or instruments, and also finds use in the construction of modular furniture. The invention is directed to a construction of an instrument cabinet which utilizes a minimum of parts and maximizes economy of manufacturing. The dimensions of the height, width, and depth can be varied to suit various applications. The design is structured around four extruded edge members mitered at their ends which receive a reinforcing member at each corner. These edge members define a front frame. The outer wrapper or enclosure includes three individual parts. There is an upper U shaped panel, a lower U shaped panel, and a dovetail bent clamp which joins the two panels. The upper and lower panels have their outer edges bent interiorly so that the dovetail bent clamp can grasp securely and retain the panels in the proper structural relationship. A rear frame is constructed either identical to the front frame or in other configurations, so that the closure members can be secured in a wrapping relationship to both the front and rear frames. There also are added interior mounting posts which are fastened to the front and rear frames respectively at the same time as fastening the panels to the frames. The purpose of the mounting posts is to further reinforce the cabinet assembly and also provide a means to mount shelves within the cabinet.

As the panels and mounting posts are fastened to the front and rear frames the cabinet becomes structurally stable. Previous to the fastening of the panels to the front frame, there was no means to maintain the frame in a fixed relationship other than the weight of the frame itself and the internal reinforcing members. However, once the components are fastened together, an extremely rigid and strong cabinet results.

Accordingly, it is a principal object of the present invention to provide a cabinet for use in the electronics industry which can be easily adapted to use in the modular furniture field.

Furthermore, it is an object to produce a cabinet which can be manufactured inexpensively, using the absolute minimum number of components, while still providing a cabinet which has sufficient strength and long life in a wide variety of applications.

A further object of the present invention is to provide a handle on each side of the cabinet integral with the cabinet and not requiring additional steps of welding or fastening a handle to the sides of the cabinet. It is also an object to have a handle on the sides of the cabinet which will be flush with the cabinet and yet still not require additional hardware to cause the handle to fold flush with the cabinet.

Yet another object of the present invention is to provide a cabinet having weld-free construction and a minimum of fastening elements. A related objective of being able to assemble the cabinet without drilling by the use of pre-drilled or grooved members to accept fasteners is also achieved.

DESCRIPTION OF THE DRAWINGS

Further objects and advantages of the present invention will become apparent as the following description of a picture frame cabinet proceeds, taken in conjunction with the accompanying drawings in which:

FIG. 1 is a front perspective view of a typical instrument cabinet illustrative of the present invention, with portions removed.

FIG. 2 is a cross-sectional view taken along Line 2—2 of FIG. 1 on an enlarged scale and broken away from the cabinet.

FIG. 3 is a cross-sectional view taken along Line 3—3 of FIG. 1 on an enlarged scale and broken away from the cabinet.

FIG. 4 is an enlarged, partially sectioned, broken view taken along Line 4—4 of FIG. 1 illustrating the dovetail clamp and the mounting post secured to the rear frame.

FIG. 5 is an exploded, enlarged, broken view in perspective taken of the right hand upper corner of the cabinet shown in FIG. 1.

FIG. 6 is a broken view on an enlarged scale with portions removed of one corner illustrating the reinforcing member within the front frame members.

FIG. 7 is a perspective view of the rear of the cabinet with portions removed illustrating a panel covering the rear portion of the cabinet.

DESCRIPTION OF THE PREFERRED EMBODIMENT

In FIG. 1 there is shown a cabinet 10, illustrative of the present invention. The forward portion of the cabinet 10 is enclosed by a front frame 11. A rear frame 12 encloses the back of the cabinet 10. An upper panel 14 encloses the top of the cabinet 10 and bends downward in substantially a 90° angle to form a portion of the vertical side. The configuration of the upper panel 14 is thus basically an inverted U-shaped design. A lower panel 13 forms the bottom and lower portions of the vertical sides by having also a U-shaped design.

Also shown in FIG. 1 is a dove-tail bent clamp 15 located between the upper panel 14 and lower panel 13. The front frame 11 and rear frame 12 are formed from four edge members 18 mitered at their respective ends.

Interior to the cabinet 10 are mounting posts 17 from which are suspended shelves 16.

The design of the edge member 18 is most clearly seen in FIG. 2 which illustrates the cross section of the edge member 18. The preferred method of manufacturing edge member 18 is by an extrusion process and the preferable material would be aluminum or an aluminum alloy. This would give the edge member 18 the required strength and lightness while still being economical to extrude.

The frame-like appearance of the cabinet is achieved by the design of the edge member 18. It can be seen that a trough 37 is defined by an outer ledge 35, an inner ledge 36, and a base 38. In effect this outer portion of the edge member 18 is one half of an I-beam structure or effectively a C configuration. The outermost portion of the edge member which frames the sides of the cabinet is an outer wall 39. Likewise, the innermost portion of the edge member 18 which frames the inside of the front or rear frames 11, 12 is an inner wall 40.

The inner half of the edge member 18 has internal to it two running slots. The first is a T-shaped running slot 42 designed to accept a reinforcing member 43. The second running slot is a striated running slot 44 designed to threadedly accept a bolt 45. Alternatively, slot 44 may have smooth walls to receive a nut which would in turn engage the bolt 45.

The assembly of the cabinet 10 is most clearly illustrated in FIG. 5. It can be seen that the edge members 18 have their ends mitered at a 45° angle to fit flush with each other. The reinforcing member 43 is substantially an L-shaped member and rectangular in cross section. It is dimensioned to be received by the T-shaped running slot 42. As the two edge members 18 are brought together with the reinforcing member 43 located within the running slot 42, one can readily appreciate the fact that the two edge members 18 could not easily bend in any direction as any bending moments would be opposed by the strength of the reinforcing member 43. As long as the two edge members 18 can be restrained from sliding apart, any bending forces will be restrained by the reinforcing member 43.

In FIG. 5 it should be noted that the upper panel 14 has a horizontal tab 19 and a vertical tab 20. These tabs are formed from the top and side of the upper panel 14 being bent around during the metal forming process. Wrapper mounting holes 21 are positioned on the tabs 19, 20. The mounting post 17 is placed within the cabinet and mounting holes 31 on the mounting post 17 are aligned with the wrapper mounting holes 21. The edge members 18 are then placed against the tabs 19, 20. The bolt 45 passes through the wrapper mounting holes 21, through the aligned mounting holes 31 on the mounting post 17, and then into the striated running slot 44 in the edge member 18. Having the running slot 44 striated, a self tapping screw or running slot containing a bolt or other fastening means is eliminated.

FIG. 2 shows the edge member 18 assembled to the upper panel 14 with the mounting post 17 sandwiched between. It should also be noted that there is a supporting ledge 41 which aligns and supports the edge member on the panels 13, 14.

FIG. 4 illustrates the formation of the handle integral with the sides of the cabinet 10. The upper panel 14 has an interiorly bent outer edge 23. Similarly, the lower panel 13 has an interiorly bent outer edge 24. The dove-tail bent clamp 15 has dove-tail ends 28 which have an interior face 29 which grasps inside surfaces 25, 27 of the interiorly bent outer edges 23, 24. The dove-tail bent clamp 15 is assembled onto interiorly bent edges 23, 24 of the panel assemblies 13, 14 before the front frame 11 is fastened to the panels.

The mounting post 17 is manufactured with a notch or U-shaped recess 33 clearly indicated in FIG. 5. The purpose of this recess is to allow the dove-tail bent clamp 15 sufficient clearance on the interior of the cabinet 10 so that it does not come into contact with the mounting post 17. Likewise, the vertical tab 20 on the upper panel 14 is cut short of the location of the dove-tail bent clamp 15 for adequate clearance. There is a similar vertical tab 22 on the lower panel 13 also cut short of the dove-tail bent clamp 15 for the same purpose. This is illustrated also in FIG. 5.

FIG. 6 illustrates the reinforcing member 43 from a rear view with the edge members 18 in position before being mounted to the panels.

FIG. 7 is a rear view of the cabinet and in this illustration the rear frame 12 identical to the front frame 11. The rear of the cabinet has a covering plate 46 positioned up against the interior mounting post 17 and fastened thereto. Thus, a cabinet with an enclosed back is formed. It is observed that only two fasteners are required in each corner to firmly and securely fasten the panels, interior mounting posts, and edge member. The structural stability of the cabinet is not fully attained until all four corners are fastened. However, during assembly the cabinet is essentially self-jigging and upon tightening of all fasteners the full strength of the cabinet is apparent. Any bending moments are restrained by the reinforcing member 43 and lateral movements of the edge members 18 are restrained either by the bolts 45 or adjacent edge members. It can readily be appreciated that other types of fasteners besides bolts could be utilized such as rivets, welds, or adhesives. Bolts, however, present the easiest and most economical method of manufacture. Likewise, the versatility of the cabinet can readily be seen by numerous shelves 16 which could be hung from the shelf mounting holes 32 throughout the cabinet. It is also feasible to manufacture the cabinet without any shelves and in lieu thereof install file drawers. The dove-tail bent clamp 15 could be painted various colors to contrast and coordinate with the colors of the lower and upper panels 13, 14. This makes the cabinet readily adaptable to use in modular furniture assemblies.

Thus, it is apparent that there has been provided, in accordance with the invention, a cabinet for electronic instrumentation or equally adapted for use in modular furniture construction that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

I claim:

1. A cabinet having a frame-like appearance comprising, in combination,
   four edge members mitered at their respective ends to define a front frame,
   said edge members having a cross section defining a running slot, a reinforcing member for each corner being L-shaped in front plan view and proportioned to fit within said running slots, a slot adjacent to said running slot for engaging a bolt or screw type member, an outer closure comprising an upper U-shaped panel, a lower U-shaped panel, each said upper and lower U-shaped panel having interiorly bent outer edges and a dove tail bent clamp for securing in metal interfering relationship said interiorly bent edges of adjacent upper and lower U-shaped panels, a rear frame, means for securing said front and rear frames to the upper and lower U-shaped panels while said panels are secured by the dove tail bent clamp, and interior mounting posts having a plurality of mounting holes, said posts secured by fastening means to said front and rear frames, whereby an enclosure is defined in which the panels coupled with the mounting members secure the frame members which are reinforced at their corners and whereby the dove tail bent clamp which secures the upper U-shaped closure portion to the lower U-shaped closure portion also defines horizontal handle assemblies on both sides of the cabinet.

2. A cabinet as in claim 1,
wherein said extruded edge members are manufactured of aluminum.

3. A cabinet as in claim 1,
wherein said running slot is T-shaped.

4. A cabinet as in claim 1,
wherein said reinforcing member is rectangular in cross section.

5. A cabinet as in claim 1,
wherein said slot for engaging a bolt or screw type member has a plurality of striations on opposed faces for threadedly engaging said bolt or screw type member.

6. A cabinet as in claim 1,
wherein each corner has two fasteners to secure said U-shaped member and interior mounting post to said frame.

7. A cabinet as in claim 1,
wherein said dove-tail bent clamp forms a handle integral to each side of said cabinet.

8. A cabinet as in claim 1,
wherein said rear frame is comprised of four extruded edge members mitered at their respective ends.

9. A cabinet having a frame-like appearance comprising, in combination, an upper U-shaped panel having interiorly bent outer edges, a lower U-shaped panel having interiorly bent outer edges, a dove tail bent clamp having outer edges bent to securely engage in grasping relationship said interiorly bent edges of said upper and lower U-shaped panels thereby serving to define a handle means and locking means to secure said upper and lower U-shaped panels, four edge members mitered at their respective ends to define a front frame, a rear frame having means for securing said upper and lower U-shaped panels to both front and rear frames while said panels are secured by the dove tail bent clamp, said edge members having a cross section defining a running slot, a reinforcing member of each front frame corner being L-shaped in front plan view and proportioned to fit within said running slots, a slot adjacent to said running slot for engaging a bolt or screw type member, and interior mounting posts having a plurality of mounting holes, said posts secured to said front and rear frames, wherein an enclosure is defined in which the panels coupled with the mounting members secure the frame members which are reinforced at their corners.

10. A cabinet as in claim 9,
wherein said extruded edge members are manufactured of aluminum.

11. A cabinet as in claim 9,
wherein said running slot is T-shaped.

12. A cabinet as in claim 9,
wherein said reinforcing member is rectangular in cross section.

13. A cabinet as in claim 9,
wherein said slot for engaging a bolt or screw type member has a plurality of striations on opposed faces for threadedly engaging said bolt or screw type member.

14. A cabinet as in claim 9,
wherein each corner has two fasteners to secure said U-shaped member and interior mounting post to said frame.

15. A cabinet as in claim 9,
wherein said rear frame is comprised of four extruded edge members mitered at their respective ends.

16. A cabinet having a frame-like appearance comprising, in combination, an upper and lower U-shaped panel each having a horizontal surface and two vertical surfaces and outer edges reversely bent interiorly so as to form an acute angle with its respective vertical surface, a dove tail bent clamp having a vertical surface with outer edges reversely bent exteriorly so as to form an acute angle with said vertical surface and dimensioned so that said dove tail clamp outer edges securely receive said upper and lower panel outer edges in grasping relationship, a handle assemble on both sides of said cabinet formed from said dove tail bent clamp, four edge members mitered at their respective ends to define a front frame, a rear frame, means for securing said upper and lower U-shaped panels to both front and rear frames, said edge members having a cross section defining a running slot, a reinforcing member for each front frame corner being L-shaped in front plan view and proportioned to fit within said running slots, a slot adjacent to said running slot for engaging a bolt or screw type member, and interior mounting posts having a plurality of mounting holes, said posts secured to said front and rear frames, whereby an enclosure is defined in which the panels coupled with the mounting members secure the frame members which are reinforced at their corners.

17. A cabinet as in claim 16,
wherein said extruded edge members are manufactured of aluminum.

18. A cabinet as in claim 16,
wherein said running slot is T-shaped.

19. A cabinet as in claim 16,
wherein said reinforcing member is rectangular in cross section.
20. A cabinet as in claim 16,
wherein said slot for engaging a bolt or screw type member has a plurality of striations on opposed faces for threadedly engaging said bolt or screw type member.
21. A cabinet as in claim 16,
wherein each corner has two fasteners to secure said U-shaped member and interior mounting post to said frame.
22. A cabinet as in claim 16,
wherein said rear frame is comprised of four extruded edge members mitered at their respective ends.
23. A cabinet having a frame-like appearance comprising, in combination,
an upper U-shaped panel having interiorly bent outer edges,
a lower U-shaped panel having interiorly bent outer edges,
a dove tail bent clamp having outer edges bent to securely engage said interiorly bent edges of said upper and lower U-shaped panels,
four edge members,
each edge member having an interior portion and an exterior portion,
said interior portion having a cross section defining a running slot with an undercut and a slot adjacent to said running slot for engaging a fastener,
said exterior portion having a cross section defining a C-shaped member,
each said member mitered at its respective ends to define a front frame,
a rear frame,
means for securing said upper and lower U-shaped panels to said front frame and said rear frame,
a reinforcing member for each corner being L-shaped in front plan view and proportioned to fit within said running slots,
and interior mounting means to support a shelf therefrom,
whereby an enclosure is defined in which the panels secure the frame members which are reinforced at their corners.

24. A cabinet as in claim 23,
wherein said interior mounting means is an interior part having a plurality of mounting holes, said posts secured to said front and rear frames.
25. A cabinet as in claim 23,
wherein said extruded edge members are manufactured of aluminum.
26. A cabinet as in claim 23,
wherein said running slot is T-shaped.
27. A cabinet as in claim 23,
wherein said reinforcing member is rectangular in cross section.
28. A cabinet as in claim 23,
wherein said slot for engaging a bolt or screw type member has a plurality of striations on opposed faces for threadedly engaging said bolt or screw type member.
29. A cabinet as in claim 23,
wherein each corner has two fasteners to secure said U-shaped member and interior mounting post to said frame.
30. A cabinet as in claim 23,
wherein said dove-tail bent clamp forms a handle integral to each side of said cabinet.
31. A cabinet as in claim 23,
wherein said rear frame is comprised of four extruded edge members mitered at their respective ends.
32. A cabinet having a frame-like appearance comprising, in combination,
an upper U-shaped panel having interiorly bent outer edges,
a lower U-shaped panel having interiorly bent outer edges,
a dove tail bent clamp having outer edges bent to securely engage in grasping relationship said interiorly bent edges of said upper and lower U-shaped panels thereby serving to define a recessed handle means and locking means to secure said upper and lower U-shaped panels,
means defining a front frame,
means defining a rear frame,
means to secure said front and rear frames to said upper and lower U-shaped panels to both front and rear frames.

* * * * *